United States Patent [19]

Inui et al.

[11] Patent Number: 5,688,871
[45] Date of Patent: Nov. 18, 1997

[54] RUBBER COMPOSITION CONTAINING A FLAVAN COMPOUND AND A METHOD FOR PRODUCING A VULCANIZED RUBBER CONTAINING SAME

[75] Inventors: Naoki Inui, Nara; Hironobu Iyama, Osaka; Kyoko Tsuta, Osaka; Hideo Nagasaki, Osaka, all of Japan

[73] Assignee: Sumitomo Chemical Company, Limited, Osaka, Japan

[21] Appl. No.: 406,134

[22] Filed: Mar. 20, 1995

[30] Foreign Application Priority Data

Mar. 18, 1994 [JP] Japan ................................ 6-048985
Mar. 18, 1994 [JP] Japan ................................ 6-048986

[51] Int. Cl.$^6$ ........................................... C08C 19/20
[52] U.S. Cl. ................................. 525/346; 525/349
[58] Field of Search ............................. 525/346, 343

[56] References Cited

U.S. PATENT DOCUMENTS 5,268,402 12/1993 Daio et al. ................................ 524/100

FOREIGN PATENT DOCUMENTS 581618 2/1994 European Pat. Off. .

OTHER PUBLICATIONS

JP-A-58-147444, Database WPI, Section Ch, Week 8341, Abstract No. 83-785855, Derwent Publications Ltd., London, GB (1983).

*Primary Examiner*—Christopher Henderson
*Attorney, Agent, or Firm*—Cushman Darby & Cushman IP Group of Pillsbury Madison & Sutro, LLP

[57] ABSTRACT

The present invention relates to a method for producing a vulcanized rubber by compounding in a kneading step at a relatively high temperature, a rubber and a flavan compound of the formula (I)

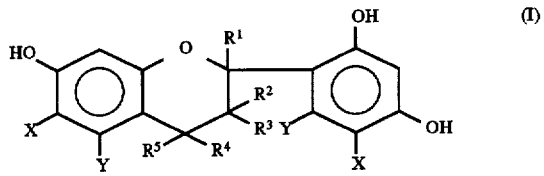

wherein $R^1$, $R^2$, $R^4$ and $R^5$ independently of one another represent a hydrogen or an aliphatic group having 1–6 6 carbon atoms, or $R^1$ and $R^2$ together with the carbon atoms to which they are attached and/or $R^4$ and $R^5$ together with the carbon atom to which they are attached form an alicyclic ring having 4–10 carbon atoms, $R^3$ is a hydrogen or an aliphatic group having 1–6 carbon atoms, and X and Y independently of one another are hydrogen, hydroxy or an aliphatic group having 1–8 carbon atoms; also, a rubber composition containing a flavan compound according to the above formula together with a cobalt-containing compound and a methylene donor; the vulcanized rubber produced through the method or from the rubber composition exhibits excellent rubber properties such as, for example, increased hardness and processability essentially free from fuming problems.

8 Claims, No Drawings

RUBBER COMPOSITION CONTAINING A FLAVAN COMPOUND AND A METHOD FOR PRODUCING A VULCANIZED RUBBER CONTAINING SAME

BACKGROUND OF THE INVENTION

1. Field of the Invention

The present invention relates to a rubber composition which exhibits very favorable adhesion properties when used in a vulcanizing adhesion with a steel cord, and which results in a vulcanized rubber that exhibits improved hardness.

The present invention also relates to a method for producing such a vulcanized rubber having increased hardness and dynamic modulus of elasticity. The present invention further relates to a tire produced from such a rubber composition and/or vulcanized rubber, and a method for increasing the hardness and dynamic modulus of elasticity of a rubber.

2. Description of the Related Art

Improved hardness and dynamic elastic modulus of vulcanized rubber used in rubber products such as tires, belts and hoses is often required. For example, in order to reduce fuel consumption, it is desirable to reduce the heat build-up in a rubber (hysteresis loss) due to periodic (dynamic) transformations during tire rotations. This has become an important subject to be solved at the tread portion and the undertread portion of a tire, which, among other tire portions, mainly contribute to the resistance to forces caused by rotations of the tire.

As a coating rubber used for the carcass portion and bead portion of a tire, a rubber which experiences little heat build-up and causes minimal separations of the coating rubber, meaning a break caused in the coating rubber by transformations during rotations of a tire, has also been desired. Such a coating rubber helps to prevent separations of the coating rubber and promotion of separations due to hysteresis loss. Hysteresis loss and breaking in a rubber are greatly influenced by the hardness and dynamic modulus of elasticity of the rubber. Hence, improvement of hardness and dynamic modulus of elasticity has been desired in order to improve such properties of rubbers as mentioned above.

Hitherto, different methods for improving the above properties have been proposed, including increasing an amount of a reinforcing material such as carbon black, or increasing the extent of vulcanization by increasing the amount of sulfur or a vulcanization accelerator. However, these methods have drawbacks mentioned below. On one hand, an increase of the amount of carbon black causes an increase in hysteresis loss and heat build-up. It also lowers the resistance to breaking, in a rubber, such as blowout resistance and cut growth resistance. Furthermore, it causes scorching. On the other hand, an increase of amount of sulfur lowers flex cracking resistance and heat-degradation resistance remarkably. Therefore, it is difficult by conventional methods to further improve both hardness and dynamic modulus of elasticity of a vulcanized rubber only by increasing an amount of a reinforcing material, a vulcanization agent, or a vulcanization accelerator.

Hitherto, a method of compounding resorcin into a rubber has been known for improving hardness and dynamic modulus of elasticity of a vulcanized rubber without increasing the heat build-up and without lowering the blowout resistance. Resorcin has been widely used because it is effective in enhancing hardness and dynamic modulus of elasticity of a rubber, to toughening the rubber, reducing loss factor of a vulcanized rubber during a dynamic transformation and reducing heat build-up. However, resorcin sublimes remarkably during processing steps such as kneading, which is quite undesirable to the environment and human health. Therefore, the use of resorcin is becoming a great social problem.

Moreover, there are problems in processing. For example, in a unvulcanized rubber where resorcin is compounded, the resorcin tends to bloom to the rubber surface, and hence, cause a scorch and a reduction in the adhesiveness between unvulcanized rubbers. Furthermore, strength properties, such as tensile properties, of vulcanized rubbers where resorcin is compounded are inferior to those of vulcanized rubbers where resorcin is not compounded. Solutions to the above-mentioned problems have been strongly desired.

In rubber products, such as tires, belts and hoses, which are required to be reinforced with a steel cord, the adhesion between the rubber and the steel cord also becomes a problem. For solving this problem, there have, hitherto, been known methods such as brass-plating or zinc-plating the surface of the steel cord, treating the surface of the steel cord with any one of a variety of chemical compounds, and compounding an adhesive together with other various compounding ingredients while processing the rubber. Among them, the method of compounding an adhesive together with other compounding ingredients during the step of processing the rubber has been widely adopted because the method makes it possible to firmly adhere the steel cord to the rubber.

This method is called dry bonding and generally comprises incorporating a methylene acceptor and a methylene donor, which releases formaldehyde upon heating, into the rubber during a processing step to obtain an unvulcanized rubber, and then adhering the unvulcanized rubber obtained to a steel cord during vulcanization. As the methylene acceptor used for the dry bonding, there have been proposed m-substituted phenols such as resorcin or m-aminophenol, a condensation product of m-substituted phenol and an aldehyde such as formaldehyde or acetaldehyde, and a condensation product of m-substituted phenol, another monosubstituted phenol and an aldehyde.

Among these methods, one in which an m-substituted phenol, particularly resorcin, is used has been widely adopted because, as mentioned above, it is effective in enhancing the hardness of the rubber, improving the dynamic modulus of elasticity of the rubber, toughening the rubber, reducing loss factor of the rubber during dynamic transformations, and reducing heat build-up. However, this method also has disadvantages mentioned above, i.e. problems caused by the sublimation of resorcin, the blooming of resorcin to the rubber surface, and the like.

As measures to overcome these disadvantages, a condensation product of resorcin with formaldehyde has been proposed in, for example, U.S. Pat. No. 2,746,898, JP-B-45-27463 (U.S. Pat. No. 3,596,696), and JP-B-47-7640 (GB-A-1,163,594). Though some of the above problems are solved to some extent with the use of a so-called resorcin resin, there are still problems with fuming of resorcin and with inferior adhesion due to the blooming of resorcin and unreacted resorcin remaining in large amounts in the resorcin resin. There is also a problem in handling because the resorcin resin tends to deliquesce and hence solidify during storage. In addition, there is a problem in that a rubber to which a resorcin resin is compounded is less improved in hardness and dynamic modulus of elasticity in comparison to a rubber to which resorcin is compounded.

In order to reduce deliquescence and solidification, for example, JP-B-52-26275 (U.S. Pat. No. 3,963,652) and JP-B-56-37902 (U.S. Pat. No. 4,257,926) propose a ternary co-condensation product of resorcin, an alkylphenol and formaldehyde; a mixture of a condensation product of resorcin and formaldehyde, and a condensation product of an alkylphenol and formaldehyde; and the like. These alkylphenol-containing resorcin resins exhibit adhesive and rubber properties equivalent or superior to those obtained with conventional resorcin resins, and a reduced tendency to deliquesce and solidify which are defects of the conventional resorcin resins.

However, even in the above alkylphenol-containing resorcin resins, since unreacted resorcin still remains to some extent in the resin, there still exists environmental and human health problems caused by the sublimation of the unreacted resorcin, and there is also the problem that hardness, dynamic modulus of elasticity, and loss factor of the rubber, where the alkylphenol-containing resorcin resin is compounded, are not necessarily sufficient. Therefore, further improvement of these compounds have been strongly desired.

In JP-A-58-147444, there is described a rubber composition containing 2,4,4-trimethyl-2',4',7-trihydroxyflavan and a compound capable of donating a methylene group upon heating, for the purpose of solving problems in a vulcanization adhesion with a reinforcing material such as a nylon, polyester, and steel cord. In the examples of JP-A-58-147444, carbon black, sulfur, and other ingredients are compounded to a rubber. Thereafter, the rubber, 2,4,4-trimethyl-2',4',7-triphydroxyflavan as a methylene acceptor, and a methylene donor are compounded together with a vulcanization accelerator. However, the rubber composition is not necessarily sufficient in vulcanizing adhesiveness. In addition, the vulcanized rubber produced from the rubber composition is not sufficient in hardness, dynamic modulus of elasticity, and loss factor.

SUMMARY OF THE INVENTION

The present inventors have conducted extensive research in order to solve the above-mentioned problems and have consequently discovered the present invention.

Accordingly, an object of the present invention is to provide a method for producing a vulcanized rubber with increased hardness, a high dynamic modulus of elasticity, and a small loss factor.

Another object of the present invention is to provide a rubber composition which can give a vulcanized rubber enhanced hardness, a high dynamic modulus of elasticity, and a small loss factor.

Yet another object of the present invention is to provide a method for producing a vulcanized rubber by compounding a compound to a rubber in a processing step such as a kneading step, wherein the method is at least essentially free from fuming problems, and the vulcanized rubber is excellent in scorch resistance, with substantially no reduction in rubber strengths such as tensile property, tear resistance, and flex-cracking resistance.

An additional object of the present invention is to provide a rubber composition, by compounding a compound to a rubber which does not sublimate during a processing step such as kneading, which exhibits reduced deliquescence and solidification during storage and excellent vulcanizing adhesiveness to steel cord, but that experiences substantially no reduction in mechanical properties during formation.

A further object of the present invention is to provide a tire produced from a vulcanized rubber obtained by one of the methods of the present invention.

A yet further object of the present invention is to provide a tire produced from a rubber composition of the present invention.

An even further object of the present invention is to provide a method for obtaining a superior vulcanizing adhesion between a rubber composition and a steel cord.

A still further object of the present invention is to provide a method for increasing hardness and dynamic modulus of elasticity of a vulcanized rubber.

DETAILED DESCRIPTION OF THE INVENTION

These objects and others are accomplished by the present invention, which provides a method for producing a vulcanized rubber comprising compounding:

carbon black;

at least one flavan compound (B) represented by the formula (I)

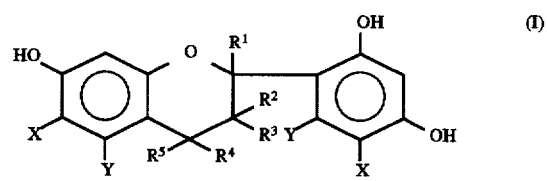

wherein $R^1$, $R^2$, $R^4$ and $R^5$ independently of one another are a hydrogen or an aliphatic group having 1–6 carbon atoms, or wherein $R^1$ and $R^2$ and the carbon atoms to which they are attached form a 4 to 10 carbon alicyclic ring and/or $R^4$ and $R^5$ and the carbon atom to which they are attached form a 4 to 10 carbon alicyclic ring, $R^3$ is a hydrogen or an aliphatic group having 1–6 carbon atoms, and X and Y independently of one another are a hydrogen, hydroxy or an aliphatic group having 1–8 carbon atoms; and at least one rubber (A) selected from natural rubber, styrene-butadiene copolymer rubber, butadiene rubber, isoprene rubber, acrylonitrile-butadiene copolymer rubber, chloroprene rubber, butyl rubber, and halogenated butyl rubber;

wherein the flavan compound (B) is compounded during an initial kneading step conducted at a temperature of 120°–180° C. to obtain an unvulcanized rubber composition; and, then, the rubber composition is vulcanized in the presence of a vulcanization agent (hereinafter, this method will be denoted Method I).

The present invention also provides a tire produced according to Method I, and a method for improving the hardness and dynamic modulus of elasticity of a vulcanized rubber produced according to Method I.

The present invention further provides a rubber composition which comprises: 100 parts by weight of at least one rubber (A) selected from natural rubber, styrene-butadiene copolymer rubber, butadiene rubber, isoprene rubber, acrylonitrile-butadiene copolymer rubber, chloroprene rubber, butyl rubber, and halogenated butyl rubber; 0.5–10 parts by weight of at least one flavan compound (B) represented by the formula (I); 0.05–1 parts by weight, as the amount of cobalt, of a cobalt-containing compound (C); and 0.5–6 parts by weight of at least one methylene donor (D) selected from a condensation product of melamine and formaldehyde, a condensation product of melamine, formaldehyde and methanol, and/or hexamethylenetetramine. (hereinafter, this rubber composition will be denoted Composition I).

The present invention still further provides: a tire produced from Composition I; a method for adhering a rubber to a steel cord which comprises compounding the ingredients (B), (C), and (D) to the rubber (A) and vulcanizing the resulting composition while bringing it into contact with the steel cord; and a method for improving the hardness and dynamic modulus of elasticity of a vulcanized rubber which comprises compounding the ingredients (B), (C), and (D) to a rubber (A) and vulcanizing the resulting composition.

The rubber (A) of the present invention is selected from natural rubber, styrene-butadiene copolymer rubber, butadiene rubber, isoprene rubber, acrylonitrile-butadiene copolymer rubber, chloroprene rubber, butyl rubber, and halogenated butyl rubber. They may be used singly or in combination of two or more.

The flavan compound (B) is represented by the formula (I). In the formula (I), $R^3$ is a hydrogen or an aliphatic group having 1–6 carbon atoms. In the formula (I), $R^1$, $R^2$, $R^4$ and $R^5$ independently of one another represent a hydrogen or an aliphatic group having 1–6 carbon atoms. When $R^1$ and $R^2$ and the carbon atoms to which they are attached combine to form an alicyclic ring, $R^1$ and $R^2$ together can represent an alkylene group having —$(CH_2)_n$— methylene groups, where n represents a number from 2 to 8. When $R^4$ and $R^5$ and the carbon atom to which they are attached combine to form an alicyclic ring, $R^4$ and $R^5$ together can represent an alkylene group having —$(CH_2)_m$— methylene groups, where m represents a number from 3 to 9. In formula (I) the aliphatic group as $R^1$, $R^2$, $R^3$, $R^4$, and/or $R^5$ can, independent of the others, be a straight chain, a branched, or a cyclo alkyl group, of which methyl, ethyl, propyl, isopropyl, butyl, pentyl, cyclopentyl, hexyl, and cyclohexyl are representative. When $R^1$ and $R^2$ form a half part of a condensation ring or when $R^4$ and $R^5$ form a half part of a spiro ring, the half part of the ring thus formed cay be, for example, a cycloalkane ring having about 4–8 carbon atoms and, most usually, it is a cyclohexane ring. X and Y independently of one another represent a hydrogen, hydroxy or an aliphatic group having 1–8 carbon atoms. In formula (I) the aliphatic group as X and/or Y can be a straight, a branched, or a cyclo group, which can be an alkyl group such as described above for $R^1$, $R^2$, $R^3$, $R^4$, and/or $R^5$, or heptyl, octyl or cyclooctyl.

The flavan compound (B) of the formula (I) can be produced according to a known method described, for example, in GB-822,659, JP-A-55-139375, JP-A-61-27980 or others. GB-822,659 describes a method for producing a flavan compound, in which acetone is subjected to a condensation reaction with a polyhydric phenol compound such as resorcin in the presence of water and a strong inorganic acid, the molar ratio of acetone to polyhydric phenol being in the range of 1:1–2:1.

JP-A-55-139375 describes a method for producing a flavan compound represented by the following formula:

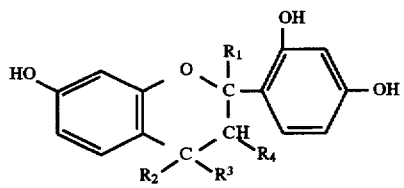

wherein $R^1$, $R^2$ and $R^3$ are a lower alkyl group and $R^4$ is a hydrogen or a lower alkyl group, in which an aliphatic ketone is subjected to a condensation reaction with resorcin at a temperature of 20°–80° C., and in the presence of an inorganic acid and water. Lower alkyl includes 1–6 carbon atoms, such as methyl, ethyl, propyl, butyl, pentyl, and hexyl. The molar ratio of resorcin to aliphatic ketone is described as being at least 3:1 and the strength of the inorganic acid being 0.1–0.5 equivalents per 1 equivalent of resorcin. Representative inorganic acids include hydrochloric acid; sulfuric acid, and phosphoric acid JP-A-61-27980 describes a method for producing a flavan compound represented by the following formula

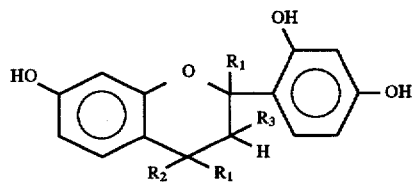

wherein $R^1$ and $R^2$ are primary alkyl groups having 1–3 carbon atoms, and $R^3$ is a hydrogen group or an alkyl group having a number of carbon atoms smaller than that of $R^2$, in which an aliphatic ketone is subjected to a condensation reaction with resorcin while adding the ketone to the resorcin at a rate of 0.45 mole/hr or slower per 1 mole of resorcin, the total ratio of ketone to resorcin being in the range of 0.34:1–1:1. The type and amount of inorganic acid, and the temperature of the reaction described are similar to the conditions described in JP-A-55-139375.

In general, therefore, flavan compounds can be produced by conducting a condensation reaction of resorcin, or 4- and/or 5-substituted resorcin with ketone, α, β-unsaturated ketone, β-hydroxyketone, α, β-unsaturated aldehyde, or β-hydroxyaldehyde in the presence of an acid catalyst in an inert solvent.

Examples of the flavan compound (B) of formula (I) which are preferably used in the present invention include: 2', 4',7-trihydroxyflavan, 2,4,4-trimethyl-2',4',7-trihydroxyflavan, 4-ethyl-2,3,4-trimethyl-2',4',7-trihydroxyflavan, 2,4-diethyl-4-methyl-2', 4',7-trihydroxyflavan, 2,4,4-triethyl-3-methyl-2',4',7-trihydroxyflavan, 2,4-diethyl-3-isopropyl-4-isobutyl-2',4',7-trihydroxyflavan, 2,4-diisobutyl-4-methyl-2',4',7-trihydroxyflavan, 6-hydroxy-4a- (2, 4-dihydroxyphenyl) -1, 2, 3, 4, 4a, 9a-hexahydroxanthene-9-spiro-1'-cyclohexane [i.e., a compound of the formula (I) in which X=Y=$R^3$=H, $R^1$ and $R^2$ form tetramethylene in combination and $R^4$ and $R^5$ form pentamethylene in combination], 2,4,4,5,6'-pentamethyl-2', 4',7-trihydroxyflavan, 2,4,4-trimethyl-2',4',5',6,7-pentahydroxyflavan, 2,4,4-trimethyl-2',4',5,6',7-pentahydroxyflavan, 2,4,4-trimethyl-5',6-di-tert-butyl-2',4',7-trihydroxyflavan, and the like.

Among the flavan compounds (B) of the formula (I), those wherein each of X and Y is hydrogen are preferably used from the viewpoint of enhanced rubber properties. Particularly, 2,4,4-trimethyl-2',4',7-trihydroxyflavan, which is obtained by a condensation reaction of resorcin and acetone, is preferred considering the availability of raw material. All of the flavan compounds (B) of formula (I) are essentially free from the fuming problems exhibited by resorcin during rubber processing steps.

The amount of the flavan compound (B) to be compounded is not limited, but, in general, the amount ranges from about 0.5–10 parts by weight per 100 parts by weight of the rubber (A). Hereinafter, the amount of the ingredient to be compounded is represented with the unit "phr" which means parts by weight per 100 parts by weight of the rubber (A). When the amount of the flavan compound (B) is less than 0.5 phr, sufficient effects cannot be obtained, and if the amount of the flavan compound (B) exceeds 10 phr, no additional increase of effects accompanying the increase in amount of flavan compound (B) can be expected; hence, an increase in the amount of flavan compound (B) above 10 phr is economically disadvantageous. More preferably, the range of amount of flavan compound (B) is about 0.5–3 phr.

In Method I, carbon black commonly used in the rubber industry such as SAF, ISAF, HAF, FEF, SRF, GPF, MT and the like may be used. The compounding amount of the carbon black is not limited, but, in view of reinforceability, hardness of rubber, heat build-up, and dynamic durability, an amount of carbon black in the range of about 20–150 phr is preferred. If desired, a filler in addition to or other than carbon black may also be compounded. The filler may include various fillers usually used in the rubber industry, for example, inorganic fillers such as silica, clay, and calcium carbonate. Particularly, in a method for producing a vulcanized rubber, such as a coating rubber used in the carcass portion of a tire, which is to be adhered to a reinforcing material such as an organic fiber cord, a hydrated silica is preferably compounded in order to improve adhesiveness between the rubber and the reinforcing material. The amount of the hydrated silica to be compounded is preferably in the range of about 5–40 phr.

Generally, in kneading a rubber composition, carbon black and other fillers, process oil, stearic acid, and the like are compounded during a first step wherein the rubber temperature is about 120°–180° C.; and vulcanization accelerators, vulcanization retarders, crosslinking agents, and the like are compounded during a second step wherein the rubber temperature is about 40°–120° C.

In Method I of the present invention, the point at which the flavan compound (B) is added is important; it must be added to the rubber during a first step wherein the rubber temperature is relatively high. By adding the flavan compound (B) during the first step, improved rubber properties such as hardness and dynamic modulus of elasticity can be attained, compared to the case wherein the flavan compound (B) is added during the above second step. The temperature during the first step when the flavan compound (B) is added is preferably about 130°–180° C., because at the higher temperature, more improvement in rubber properties can be attained. After adding ingredients including carbon black and the flavan compound (B) in the first step at relatively high temperature, subsequent steps are carried out at a lower temperature, for example, of about 40°–120° C., during which a vulcanization agent such as sulfur is compounded and, if necessary, a vulcanization accelerator is compounded, and, then, vulcanization is conducted. The amount of sulfur is usually about 1–10 phr.

The type of mixer used for the first kneading step and the second kneading step are not limited and those usually used in the rubber industry such as a Banbury mixer, a kneader and an open mill can be used. Different kinds of mixers can be used in the first step and the second step.

In Method I of the present invention, a methylene donor, which is usually used in the rubber industry, together with a methylene acceptor such as resorcin may be compounded in addition. Examples of the methylene donor include: a condensation product of melamine and formaldehyde, such as dimethylol melamine, trimethylol melamine, tetramethylol melamine and hexamethylol melamine; a condensation product of melamine, formaldehyde and methanol, such as hexakis (methoxymethyl) melamine and pentakis (methoxymethyl) methylol melamine; and hexamethylenetetramine. They are used singly or in combination of two or more. Among them, a condensation product of melamine, formaldehyde and methanol is preferred. The amount of the methylene donor, is in a range of about 0.5–6 phr. When the amount of the methylene donor is less than about 0.5 phr, the hardness of the rubber obtained by this method is not improved very effectively. On the other hand, if the amount of the methylene donor exceeds about 6 phr, elongation at break, tensile strength and tensile stress of the rubber are lowered, and the retention of tensile strength and tensile stress after a heat degradation are also lowered. Hence, exceeding 6 phr is not preferred. The methylene donor is preferably compounded during the second step at relatively low temperature.

In Method I of the present invention, one or more kinds of various rubber chemicals, which are usually used in the rubber industry, for example, antidegradants such as antioxidants and antiozonants, vulcanizing agents, cross-linking agents, vulcanization accelerators, retarders, peptizers, tackifiers, processing aids, waxes, oils, stearic acid and the like may be used in addition, if necessary. The amount of any of the rubber chemicals used varies depending on their intended use, but is preferably in a range in which the rubber chemicals are usually used in the rubber industry.

It is preferred that at least one kind of antidegradant selected from N-phenyl-N'-1,3-dimethylbutyl-p-phenylenediamine and a polymerized compound of 2,2,4-trimethyl-1,2-dihydroquinoline is compounded. The amount of the antidegradant is usually in the range of about 0.5–3 phr.

For the vulcanization of Method I, optimum conditions may be adopted according to the kind of base rubber and compounding ingredients utilized. The vulcanization conditions per se may be those which have been heretofore generally adopted in the rubber industry and are not limited by this invention.

The vulcanized rubber produced by Method I exhibits excellent properties when it is applied to portions of tires or other rubber products. For example, applying the rubber of Method I to portions of tires such as tread portions, carcass portions, sidewall portions and bead portions, produces tires having excellent properties.

The cobalt-containing compound (C) used in Composition I can be carbon and cobalt containing compound such as cobalt carbonate, or an organic cobalt compound, for example, a cobalt salt of an organic acid or an organic cobalt complex. A cobalt-containing compound can be used singly or in combination of two or more of such compounds. In general, salts of organic acids having up to 30, more preferably 20, carbon atoms can be used. Examples of a cobalt salt of an organic acid include a cobalt salt of a fatty acid such as cobalt stearate and cobalt propionate; cobalt naphthenate; cobalt benzoate; cobalt p-hydroxybenzoate; cobalt salt of rhodinic acid; and a compound consisting of a cobalt salt of a fatty acid and boron. A compound consisting of a cobalt salt of a fatty acid and boron is represented by the following formula:

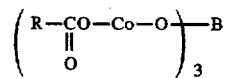

wherein R is an alkyl group, preferably an alkyl group having 20 or less carbon atoms, and more preferably an alkyl group having 6–14 carbon atoms (such as "MANOBOND C CP420" and "MANOBOND C 680C" manufactured by Manchem. Co., Ltd.). Examples of an organic cobalt complex include cobalt acetyl acetonate and acetylacetoanilide—cobalt complex. Among the cobalt-containing compounds (C), cobalt (II) carbonate is preferably used. The amount of the organic cobalt compound is in a range of about 0.05–1 phr, as the amount of cobalt. When the amount, as the amount of cobalt, is less than about 0.05 phr, sufficient adhesiveness to steel cord cannot be obtained. More than about 1 phr is not preferred, because heat resistance and flex cracking resistance are lowered.

The methylene donor (D) used in Composition I is selectable from a condensation product of melamine and formaldehyde, a condensation product of melamine, formaldehyde and methanol, and/or hexamthylenetetramine. They are used singly or in combination. Among them, the condensation products of melamine, formaldehyde and methanol include those usually used in the rubber industry, such as hexakis (methoxymethyl) melamine, pentakis (methoxymethyl) methylol melamine and tetrakis (methoxymethyl) dimethylol melamine. Among them, hexakis (methoxymethyl) melamine alone or a mixture containing the same as a major ingredient is preferred. The amount of the methylene donor (D) is in a range of about 0.5–6 phr, preferably about 1–4 phr. When the amount of the methylene donor (D) is less than 0.5 phr, adhesiveness is not improved effectively and hardness of the vulcanized rubber produced from the rubber composition is not improved very effectively. On the other hand, an amount exceeding 6 phr is not preferred, because if the amount exceeds 6 phr, elongation at break of the vulcanized rubber is lowered, and the retention of tensile strength and tensile stress after a heat degradation is also lowered.

By using the ingredients (B), (C), and (D) explained above together with the rubber (A), for example, excellent adhesiveness of the vulcanized rubber to steel cord can be attained, which cannot be attained without a cobalt-containing compound (C); i.e., by a combination of only a rubber (A), a flavan compound (B), and a methylene donor (D). In addition, hardness, dynamic modulus of elasticity and loss factor of the vulcanized rubber are significantly improved. Particularly, by practicing the methods of the present invention, the adhesiveness attained of the vulcanized rubber to steel cord and the dynamic modulus of elasticity attained are improved compared to the performance of a conventionally known rubber composition in which resorcin was compounded.

Therefore, Composition I is very effective for a vulcanizing adhesion between a rubber and a steel cord. Examples of steel cord that are particularly suited for adhering to the rubber include a brass-plated steel cord and a zinc-plated steel cord, but, in general, the rubber may be applied to any steel cord typically used in the tire industry. Two or more kinds of steel cord can be used together, although reinforcement can be attained by using only one kind of steel cord. More preferably, Composition I exhibits excellent adhesiveness between the rubber and a brass-plated steel cord.

Composition I of the present invention may further contain a reinforcing material and/or a filler, if necessary. Any reinforcing materials and fillers usually used in the rubber industry may be used in Composition I. For example, a reinforcing material such as carbon black and an inorganic filler such as silica, clay and calcium carbonate can be used. Among them, carbon black is preferably compounded in view of the properties of reinforcibility, hardness of rubber, heat build-up and dynamic durability, particularly in view of hardness of rubber. Types of carbon black usually used in the rubber industry such as SAF, ISAF, HAF, FEF, SRF, GPF, MT and the like can be used. The compounding amount of the reinforcing material and/or the filler is preferably in a range of about 20–150 phr, more preferably in a range of about 40–80 phr. Furthermore, separately from carbon black or together with carbon black, hydrated silica is also preferably compounded in order to improve adhesiveness. The amount of the hydrated silica to be compounded is preferably in a range of about 5–40 phr.

In Composition I, one or more kinds of various rubber chemicals, which are usually used in the rubber industry, for example, antidegradants such as antioxidants and antiozonants, vulcanization agents, cross-linking agents, vulcanization accelerators, retarders, peptizers, tackifiers, processing aids, waxes, oils, stearic acid and the like, can be used in addition, if necessary. The amount of the rubber chemicals used, if any, varies depending on their intended use, but is generally in a range in which the rubber chemicals are used in the rubber industry.

Particularly, benzothiazole vulcanization accelerators such as 2-mercaptobenzothiazole, dibenzothiazyl, disulfide, N-alkylsubstituted benzothiazylsulfenamide, N-cycloalkylsubstituted benzothiazylsulfenamide, N-alkylsubstituted benzothiazylsulfenimide and N-cycloalkylsubstituted benzothiazylsulfenimide are preferably used because improved adhesiveness can be expected by compounding the same and carrying out the vulcanization. The number of the N-substitutedalkyl or N-substitutedcycloalkyl in the N-alkyl- or N-cycloalkylsubstituted benzothiazylsulfenamide may be one or two. When two alkyl groups are linked at the N-position, they may form a morpholine ring together with the nitrogen atom. The alkyl group substituted at the N-position may be a straight chain, or a branched chain. Examples of N-alkyl- or N-cycloalkylsubstituted benzothiazylsulfenamide include N-cyclohexyl-2-benzothiazylsulfenamide, N-tert-butyl-2-benzothiazylsulfenamide, N-amyl-2-benzothiazylsulfenamide, N-oxydiethylene-2-benzothiazylsulfenamide and N,N'-dicyclohexyl-2-benzothiazylsulfenamide. Examples of N-alkyl- or N-cycloalkylsubstituted benzothiazylsulfenimide include N-tert-butyl-2-benzothiazylsulfenimide and N-cyclohexyl-2-benzothiazylsulfenimide. Among them, N,N'-dicyclohexyl-2-benzothiazylsulfenamide is preferred in view of improved hardness and adhesiveness. The compounding amount of the vulcanization accelerators, particularly benzothiazole vulcanization accelerators, is preferably in a range of about 0.1–4 phr.

In Composition I, it is preferred that at least one kind of antidegradant selected from N-phenyl-N'-1,3-dimethylbutyl-p-phenylenediamine and 2,2,4-trimethyl-1,2-dihydroquinoline is compounded. The amount of the antidegradant is usually in a range of about 0.5–3 phr.

The rubber composition of the present invention is usually vulcanized after compounding with a vulcanizing agent, preferably sulfur. Typically, vulcanization is carried out in contact with a steel cord. Sulfur as a vulcanizing agent may be one of a variety of sulfurs usually used in the rubber industry. The sulfur may be insoluble in rubber or insoluble in an organic solvent (i.e., acetone), or the sulfur may be soluble. The amount of the sulfur compounded is usually in a range of about 1–10 phr. An insoluble sulfur is preferably compounded in view of the improvement in adhesiveness to a steel cord. The amount of insoluble sulfur is preferably about 4–10 phr.

Composition I of the present invention exhibits excellent properties when applied to a portion of a tire or other rubber products, particularly when applied to a portion to be reinforced with steel cord. For example, Composition I may be applied to a carcass portion, a bead portion or the like portion of a tire to be reinforced with a steel cord. The portion where Composition I is applied may be subjected to a molding and a vulcanization in contact with a steel cord in the same manner as conducted usually in the tire industry to produce a tire.

In a vulcanization in contact with a steel cord, optimum conditions may be adopted according to the kind of the base rubber and the kind of the compounding ingredients utilized. Even when vulcanization is carried out without contacting a steel cord, a vulcanized rubber excellent in hardness and dynamic modulus of elasticity can be obtained from Composition I. The vulcanization conditions per se may be those which have been heretofore generally adopted in the rubber industry and are not limited by this invention.

A rubber composition which exhibits favorable adhesion properties and other beneficial strength properties is described in JP-06-48985, filed on Mar. 18, 1994, and JP-06-048986, filed on Mar. 18, 1994, the complete disclosures of which are hereby incorporated by reference.

EXAMPLES

The present invention is illustrated by the following non-restrictive Examples. In the following Examples, "%" and "parts" for expressing an added amount and content are "% by weight" and "parts by weight," respectively, unless otherwise mentioned.

The flavan compounds (B) used in the Examples of the present invention and the methylene acceptor used in the Comparative examples are denoted by the following symbols.

B1: 2,4,4-trimethyl-2'4'7-trihydroxyflavan
B2: 2,4-diethyl-4-methyl-2'4'7-trihydroxyflavan
B3: 2,4,4-trimethyl-3-methyl-2'4'7-trihydroxyflavan
B4: 2,4-diisobutyl-4-methyl-2'4'7-trihydroxyflavan
B5: 6-hydroxy-4a-(2,4-dihydroxyphenyl)-1,2,3,4,4a,9a-hexahydroxanthene-9-spiro-1'-cyclohexane
X: resorcin

Example 1

| <Compounding recipe> | |
|---|---|
| Natural rubber (RSS #1) | 100 parts |
| HAF carbon black (N330) | 45 parts |
| Stearic acid | 3 parts |
| Hydrated silica (Nispil AQ manufactured by Nippon Silica Kogyo) | 10 parts |
| Zinc oxide | 5 parts |
| Antidegradant (N-phenyl-N'-1,3-dimethylbutyl p-phenylene diamine) | 2 parts |
| Test compound: described in Table 1 | 2 parts |
| Vulcanization accelerator (N-cyclohexyl-2-benzothiazylsulfenamide) | 1 part |
| Sulfur | 2 parts |
| Methoxylated methylolmelamine resin (Sumikanol 507 manufactured by Sumitomo Chemical Co., Ltd.) | 4 parts |

A 600-ml Laboplastomill manufactured by Toyo Seiki Seisakusho was used as a Banbury mixer. The natural rubber, carbon black, stearic acid, hydrated silica, zinc oxide, antidegradant and Test compound were added thereto according to the above compounding recipe at an oil bath temperature of 150° C., and kneaded at a mixer rotation rate of 50 rpm for 15 minutes (first step). The temperature of the rubber during this step was 155°–165° C.

Subsequently, the compounded rubber composition was transferred to an open mill, the vulcanization accelerator, sulfur and the methoxylated methylolmelamine resin were added thereto according to the above compounding recipe, and the resulting composition was kneaded (second step) to obtain a test sample. The temperature of the rubber during this step was 50°–70° C.

A test sample for comparison was also prepared according to the same manner mentioned above except that the test compound was not added during the first step, wherein a Banbury mixer was used, but was added and kneaded together with the vulcanization accelerator, sulfur and the methoxylated methylolmelamine resin during the second step, wherein an open mill was used.

A part of each of the test samples thus prepared was subjected to Mooney scorch testing. The remainder of each of the test samples was shaped into a prescribed shape and vulcanized at 145° C. for 30 minutes to prepare a test piece for dynamic viscoelasticity testing, hardness testing and tensile property testing. Each test was conducted according to the following manner. The results are presented in Table 1.

Mooney scorch test

The rubber compound test samples before vulcanization were subjected to Mooney scorch testing according to JIS K 6300 to determine Mooney scorch time($t_5$), which is the time required for raising 5 points from the lowest value at 125° C. A longer Mooney scorch time indicates that the compound is difficult to scorch and has excellent processability.

Dynamic viscoelasticity test

As a dynamic viscoelasticity tester, a viscoelasticity spectrometer F- III, manufactured by Iwamoto Seisakusho Co., Ltd., was used and dynamic modulus of elasticity (E') and loss factor (tan δ) were measured at an initial load of 100 g, a dynamic load of 20 g, a frequency of 10 Hz and a temperature of 60° C. A larger value of dynamic modulus of elasticity (E') indicates superior toughening effect and a smaller value of loss factor (tan δ) indicates smaller heat build-up and superior blowout resistance.

Hardness test

According to JIS K 6301, using a right cylinder shaped sample having a thickness of 12.7 mm, hardness was measured by a spring type hardness tester (A type).

Tensile property test

According to JIS K 6301, using dumbbell No. 3 test pieces, tensile strength, elongation at break and tensile stress ($M_{300}$) were measured. A larger value of tensile strength, elongation at break and tensile stress indicate superior tensile properties.

TABLE 1

Results in Example 1

| | Test Compound | | | | Mooney -scorch time | Dynamic viscoelasticity at 60° C. | | | Tensile Properties | | |
|---|---|---|---|---|---|---|---|---|---|---|---|
| Run No. | Kind of compound ↓ | Amount (parts) | *1 ↓ | *2 ↓ | ($t_5$) (min.) | E' (MPa) | tan δ | Hard -ness | Tensile Strength (MPa) | Elonga -tion at break (%) | $M_{300}$ (MPa) |
| Example of the present invention | | | | | | | | | | | |
| 1 | B1 | 2 | 1st | 4 | 17.9 | 20.3 | 0.067 | 75 | 23.8 | 450 | 15.2 |
| 2 | B2 | 2 | 1st | 4 | 18.1 | 19.7 | 0.069 | 74 | 23.9 | 450 | 15.3 |
| 3 | B3 | 2 | 1st | 4 | 18.0 | 19.5 | 0.070 | 74 | 24.2 | 460 | 14.9 |
| 4 | B4 | 2 | 1st | 4 | 18.1 | 19.3 | 0.071 | 74 | 24.0 | 450 | 14.9 |
| 5 | B5 | 2 | 1st | 4 | 18.1 | 20.1 | 0.069 | 74 | 24.0 | 450 | 15.1 |
| Comparison | | | | | | | | | | | |
| 6 | not compounded | | | | 18.0 | 10.2 | 0.100 | 65 | 24.6 | 470 | 14.1 |
| 7 | X | 2 | 1st | 4 | 13.0 | 19.0 | 0.071 | 74 | 21.6 | 410 | 15.0 |
| 8 | B1 | 2 | 2nd | 4 | 18.0 | 14.3 | 0.088 | 69 | 24.0 | 450 | 14.1 |
| 9 | B2 | 2 | 2nd | 4 | 18.2 | 13.5 | 0.094 | 68 | 23.8 | 450 | 14.0 |
| 10 | B3 | 2 | 2nd | 4 | 18.0 | 14.0 | 0.092 | 67 | 23.9 | 450 | 14.1 |
| 11 | B4 | 2 | 2nd | 4 | 18.2 | 14.1 | 0.089 | 68 | 23.7 | 440 | 14.0 |
| 12 | B5 | 2 | 2nd | 4 | 18.1 | 14.2 | 0.088 | 69 | 24.0 | 450 | 14.1 |

*[1] Kneading step when the test compound was compounded. 1st: compounded in the first step, 2nd: compounded in the second step
*[2] Amount of the methoxylated methylolmelamine (parts)

Example 2

| <Compounding recipe> | |
|---|---|
| Natural rubber (RSS#3) | 100 parts |
| ISAF carbon black (N220) | 50 parts |
| Stearic acid | 1 part |
| Zinc oxide | 5 parts |
| Aromatic oil | 5 parts |
| Antidegradant (polymerized compound of 2,2,4-trimethyl-1,2-dihydroquinoline) | 2 parts |
| Test compound: described in Table 2 | 1.5 parts |
| Vulcanization accelerator (N,N-dicyclo hexyl-2-benzothiazylsulfenamide) | 1.25 parts |
| Sulfur | 1.5 parts |
| Methoxylated methylolmelamine resin (Sumikanol 507 manufactured by Sumitomo Chemical Co., Ltd.) | described in Table 2 |

A 600-ml Laboplastomill manufactured by Toyo Seiki Seisakusho was used as a Banbury mixer. The natural rubber, carbon black, stearic acid, zinc oxide, aromatic oil, antidegradant and Test compound were added thereto according to the above compounding recipe at an oil bath temperature of 150° C., and kneaded at a mixer rotation rate of 50 rpm for 15 minutes (first step). The temperature of the rubber during this step was 155°–160° C.

Subsequently, the compounded rubber composition was transferred to an open mill, the vulcanization accelerator, sulfur and the methoxylated methylolmelamine resin were added thereto according to the above compounding recipe, and the resulting composition was kneaded (second step) to obtain a test sample. The temperature of the rubber during this step was 50°–70° C.

A test sample for comparison was also prepared according to the same manner mentioned above except that the Test compound was not added during the first step, wherein a Banbury mixer was used, but was added and kneaded together with the vulcanization accelerator, sulfur and the methoxylated methylolmelamine resin during the second step, wherein an open mill was used.

A part of each of the test samples thus prepared was subjected to Mooney scorch testing. The remainder of each of the test samples was shaped into a prescribed shape and vulcanized at 150° C. for 35 minutes to prepare a test piece for dynamic viscoelasticity testing, hardness testing and tensile property testing. The dynamic viscoelasticity test was conducted according to the following manner. The Mooney scorch test was conducted according to the manner set forth in Example 1 except that the measuring temperature was 135° C. The hardness test and tensile property test were conducted according to the manner set forth in Example 1. The results are presented in Table 2.

Dynamic viscoelasticity test

As a dynamic viscoelasticity tester, a viscoelasticity spectrometer F- III, manufactured by Iwamoto Seisakusho Co., Ltd., was used and dynamic modulus of elasticity (E') and loss factor (tan δ) were measured at an initial strain of 10%, amplitude of dynamic strain of 0.5%, frequency of 1 OHz and temperature of 60° C. A larger value of dynamic modulus of elasticity (E') indicates superior toughening effect and a smaller value of loss factor (tan δ) indicates smaller heat build-up and superior blowout resistance.

TABLE 2

Results in Example 2

| Run No. | Test Compound Kind of compound | Amount (parts) | *1 | *2 | Mooney -scorch time (t₅) (min.) | Dynamic viscoelasticity at 60° C. E' (MPa) | tan δ | Hard -ness | Tensile Properties Tensile Strength (MPa) | Elonga -tion at break (%) | M₃₀₀ (MPa) |
|---|---|---|---|---|---|---|---|---|---|---|---|
| *Example of the present invention* | | | | | | | | | | | |
| 1 | B1 | 1.5 | 1st | 2 | 49.9 | 17.5 | 0.117 | 69 | 22.5 | 480 | 12.5 |
| 2 | B1 | 1.5 | 1st | 4 | 49.3 | 19.6 | 0.113 | 73 | 22.7 | 460 | 14.0 |
| 3 | B5 | 1.5 | 1st | 2 | 50.3 | 17.3 | 0.119 | 69 | 22.4 | 480 | 12.4 |
| *Comparison* | | | | | | | | | | | |
| 4 | not compounded | | | | 50.5 | 9.7 | 0.132 | 60 | 22.2 | 510 | 10.7 |
| 5 | X | 1.5 | 1st | 2 | 44.2 | 11.7 | 0.122 | 69 | 20.5 | 450 | 11.7 |
| 6 | B1 | 1.5 | 2nd | 2 | 49.7 | 13.2 | 0.127 | 64 | 22.5 | 480 | 11.0 |
| 7 | B5 | 1.5 | 2nd | 2 | 50.4 | 13.0 | 0.129 | 63 | 22.3 | 490 | 10.8 |

*¹Kneading step when the test compound was compounded. 1st: compounded in the first step, 2nd: compounded in the second step
*²Amount of the methoxylated methylolmelamine (parts)

Examples 3–7

| <Compounding recipe> | |
|---|---|
| Natural rubber (RSS #1) | 100 parts |
| HAF carbon black (N330) | 45 parts |
| Stearic acid | 3 parts |
| Hydrated silica (Nispil AQ manufactured by Nippon Silica Kogyo) | 10 parts |
| Zinc oxide | 5 parts |
| Antidegradant (polymerized product of 2,2 4-trimethyl-1,2-dihydroquinoline) | 2 parts |
| Flavan compound: ingredient(B) | 2 parts |
| Vulcanization accelerator (N,N-dicyclo hexyl-2-benzothiazylsulfenamide) | 0.7 parts |
| Sulfur | 4 parts |
| Cobalt naphthenate(cobalt content is 11%): ingredient(C) | 2 parts |
| Methoxylated methylolmelamine resin: ingredient(D) (Sumikanol 507 manufactured by Sumitomo Chemical Co., Ltd.) | 4 parts |

A 600-ml Laboplastomill manufactured by Toyo Seiki Seisakusho was used as a Banbury mixer. The natural rubber, carbon black, stearic acid, hydrated silica, zinc oxide, antidegradant and flavan compound (B) were added thereto according to the above compounding recipe at an oil bath temperature of 150° C., and kneaded at a mixer rotation rate of 50 rpm for 15 minutes. The temperature of the rubber during this time was 145°–160° C.

Subsequently, the compounded rubber was transferred to an open mill, the vulcanization accelerator, sulfur, cobalt naphthenate and the methoxylated methylolmelamine resin were added thereto, and the resulting mixture was kneaded to obtain a test sample. After kneading, a test piece from a part of each of the test samples was prepared for adhesiveness testing by bringing it into contact with a brass-plated steel cord and vulcanizing it at 150° C. for 30 minutes by a vulcanizing press. Another test piece for dynamic viscoelasticity testing, hardness testing and tensile property testing was prepared by shaping the remainder of each of the test samples into a prescribed shape, followed by vulcanization at 150° C. for 30 minutes. The following tests were conducted using each of the test pieces thus prepared. The adhesiveness test was conducted according to the following manner. Dynamic viscoelasticity testing, hardness testing and tensile property testing were conducted according to the manner set forth for each test in Example 1. The results are presented in Table 3.

Adhesiveness test

The rubber compound before vulcanization was brought into contact with a brass-plated steel cord and vulcanized. Then, adhesiveness was evaluated according to the H test described in ASTM D 2138. The result indicated is the average value of the results obtained from 12 test pieces.

TABLE 3

Results in Example 3–7

| Example No. | Kind of Ingredient (B) | Adhesive -ness (N) | Dynamic viscoelasticity at 60° C. E' (MPa) | tan δ | Hardness | Tensile Properties Tensile Strength (MPa) | Elongation at break (%) | M₃₀₀ (MPa) |
|---|---|---|---|---|---|---|---|---|
| 3 | B1 | 280.8 | 42.9 | 0.061 | 83.7 | 23.73 | 440 | 17.36 |
| 4 | B2 | 281.1 | 41.6 | 0.063 | 83.0 | 23.26 | 420 | 17.29 |

TABLE 3-continued

Results in Example 3-7

| | | | Dynamic viscoelasticity at 60° C. | | | Tensile Properties | | |
|---|---|---|---|---|---|---|---|---|
| | Kind of | Adhesive | | | | Tensile | Elongation | |
| Example No. | Ingredient (B) | -ness (N) | E' (MPa) | tan δ | Hardness | Strength (MPa) | at break (%) | M₃₀₀ (MPa) |
| 5 | B3 | 279.8 | 42.9 | 0.062 | 84.1 | 22.55 | 420 | 17.18 |
| 6 | B4 | 279.5 | 40.9 | 0.064 | 83.5 | 23.44 | 430 | 17.29 |
| 7 | B5 | 280.4 | 41.5 | 0.062 | 83.2 | 23.69 | 430 | 17.27 |

Comparative Examples

Comparative Example 1

Example 3 was repeated except that ingredients (B), (C) and (D) were not used. The results are presented in Table 4.

Comparative Examples 2-7

Example 3 or Example 7 was repeated except that one or two of ingredients (C) and (D) were not used. The results are presented in Table 4.

Comparative Example 8

Example 3 or Example 7 was repeated except that ingredient (B), the flavan compound, was replaced by resorcin (compound X). The results are presented in Table 4.

TABLE 4

Results in Comparative Example 1-8

| Compara-tive Example No. | Kind of Ingredient (B)-(D) | Adhesive -ness (N) | Dynamic viscoelasticity at 60° C. | | | Tensile Properties | | |
|---|---|---|---|---|---|---|---|---|
| | | | E' (MPa) | tan δ | Hardness | Tensile Strength (MPa) | Elongation at break (%) | M₃₀₀ (MPa) |
| 1 | not compounded | 205.5 | 9.2 | 0.109 | 68.7 | 26.68 | 500 | 13.34. |
| 2 | B1 only | 215.1 | 15.8 | 0.079 | 75.0 | 24.58 | 460 | 13.40 |
| 3 | B1 + C | 245.8 | 20.9 | 0.099 | 77.1 | 24.06 | 420 | 13.00 |
| 4 | B1 + D | 225.5 | 29.8 | 0.071 | 79.5 | 23.80 | 430 | 14.01 |
| 5 | B5 only | 209.4 | 10.9 | 0.084 | 73.3 | 24.14 | 440 | 13.11 |
| 6 | B5 + C | 238.8 | 17.9 | 0.104 | 75.5 | 23.00 | 420 | 13.85 |
| 7 | B5 + D | 220.0 | 25.5 | 0.082 | 76.2 | 23.92 | 430 | 13.26 |
| 8 | X + C + D | 249.9 | 30.1 | 0.068 | 80.3 | 21.89 | 410 | 16.44 |

Ingredient(C): Cobalt naphthenate
Ingredient(D): Methoxylated methylolmelamine resin

Example 8

(Evaluation of fuming)

Fuming of the flavan compounds B1-B5 and the compound X (resorcin used for comparison) were evaluated by the following manner. About 3 g of each compound were put into a sample bottle and, after heating at 145° C. or at 180° C. for 6 hours in a constant temperature bath, the weight retention ratio of each sample was measured. The results are presented in Table 5.

TABLE 5

| heating temp. | TEST COMPOUND | | | | | |
|---|---|---|---|---|---|---|
| | B1 | B2 | B3 | B4 | B5 | X |
| weight ret'n ratio 145° C. | 100.0 | 100.0 | 100.0 | 100.0 | 100.0 | 98.1 |
| 180° C. | 99.5 | 99.5 | 99.5 | 99.5 | 99.6 | 91.8 |

As shown in Table 5, fuming of the flavan compounds of the present invention is less than that exhibited by resorcin.

According to the present invention (Method I and Composition I), in which flavan compounds are used and can be compounded together with other ingredients in a kneading step conducted at high temperature, a vulcanized rubber exhibiting improved hardness and dynamic modulus of elasticity can be produced. Additionally, fuming, which is a disadvantage of the conventional method, wherein resorcin is used instead of a flavan compound, can be essentially eliminated. High quality vulcanized rubber can be produced according to the present invention, which is good in rubber strength, such as tensile properties and scorch resistance.

The rubber composition of the present invention (Composition I) comprises a flavan compound which is essentially free from fuming at processing steps such as kneading and vulcanization, and gives a vulcanized rubber having excellent properties of adhesiveness in vulcanization of the composition to steel cord. The vulcanized rubber obtained from the rubber composition (I) not only exhibits improved hardness and toughness, but, also, in a dynamic transformation, exhibits improved modulus of elasticity and loss factor, which indicates excellent toughening effects in a dynamic state. Accordingly, a rubber product having excellent rubber strength properties can be obtained by applying the rubber composition of the present invention to a material to be reinforced with steel cord.

What we claim is:

1. A method for producing a vulcanized rubber comprising compounding:

carbon black;

at least one flavan compound (B) represented by the formula (I)

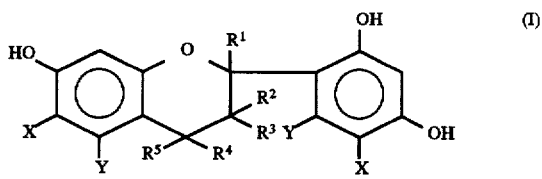

wherein $R^1$, $R^2$, $R^4$ and $R^5$ independently of one another represent a hydrogen or an aliphatic group have 1–6 carbon atoms, or wherein at least one of $R^1$ and $R^2$ or $R^4$ and $R^5$, form an alicyclic ring having 4–10 carbon atoms, $R^3$ represents a hydrogen or an aliphatic group having 1–6 carbon atoms, and X and Y independently of one another represent a hydrogen, hydroxy or an aliphatic group having 1–8 carbon atoms; and at least one rubber (A) selected from the group consisting of natural rubber, styrene-butadiene copolymer rubber, butadiene rubber, isoprene rubber, acrylonitrile-butadiene copolymer rubber, chloroprene rubber, butyl rubber and halogenated butyl rubber;

wherein the flavan compound (B), and the rubber (A) are compounded during a kneading step conducted at a temperature of about 120°–180° C. to obtain an unvulcanized rubber composition, and the unvulcanized rubber composition is then vulcanized in the presence of a vulcanization agent at a temperature about 40°–120° C.

2. The method according to claim 1, wherein X and Y are each a hydrogen group.

3. The method according to claim 1, wherein the flavan compound (B) is 2,4,4-trimethyl-2',4',7-trihydroxyflavan.

4. The method according to claim 1, wherein the carbon black is compounded together with a flavan compound (B) and a rubber (A) during the kneading step at the temperature of about 130°–180° C.

5. The method according to claim 4, wherein the carbon black is present in about 20–150 parts by weight and the flavan compound (B) is present in about 0.5–10 parts by weight, per 100 parts by weight of the rubber (A).

6. The method according to claim 1, wherein the vulcanizing agent is sulfur.

7. The method according to claim 1, wherein said method further comprises compounding an antidegradant selected from the group consisting of N-phenyl-N'-1,3-dimethylbutyl-p-phenylenediamine and a polymerization compound of 2,2,4-trimethyl-1,2-dihydroquinoline.

8. A method for increasing hardness and dynamic modulus of elasticity of a vulcanized rubber comprising compounding:

carbon black;

at least one flavan compound (B) represented by the formula (I)

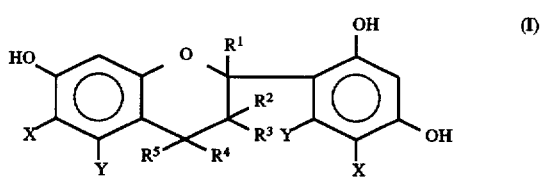

wherein $R^1$, $R^2$, $R^3$, $R^4$ and $R^5$ independently of one another represent a hydrogen or an aliphatic group having 1–6 carbon atoms, or wherein at least one of $R^1$ and $R^2$ or $R^4$ and $R^5$ form an alicyclic ring having 4–10 carbon atom, $R^3$ represents a hydrogen or an aliphatic group having 1–6 carbon atoms, and X and Y independently of one another represent a hydrogen, hydroxy or an aliphatic group having 1–8 carbon atoms; and at least one rubber (A) selected from the group consisting of natural rubber, styrene-butadiene copolymer rubber, butadiene rubber, isoprene rubber, acrylonitrile-butadiene copolymer rubber, chloroprene rubber, butyl rubber and halogenated butyl rubber;

wherein the flavan compound (B), and the rubber (A) are compounded during a kneading step conducted at a temperature of about 120°–180° C. to obtain an unvulcanized rubber composition, and the unvulcanized rubber composition is then vulcanized in the presence of a vulcanization agent at a temperature of about 40°–120° C.

* * * * *